US012547447B2

(12) United States Patent
Li et al.

(10) Patent No.: US 12,547,447 B2
(45) Date of Patent: Feb. 10, 2026

(54) DISPATCHING AND CONTROL CLOUD DATA PROCESSING METHOD, APPARATUS AND SYSTEM

(71) Applicant: CHINA ELECTRIC POWER RESEARCH INSTITUTE, Beijing (CN)

(72) Inventors: Dapeng Li, Beijing (CN); Lixin Li, Beijing (CN); Qingbo Yang, Beijing (CN); Lei Tao, Beijing (CN); Yunhao Huang, Beijing (CN); Fangchun Di, Beijing (CN); Xuri Song, Beijing (CN); Xiaolin Qi, Beijing (CN); Nan Yang, Beijing (CN); Can Cui, Beijing (CN); Wenyue Xia, Beijing (CN); Ruili Ye, Beijing (CN); Shuzhou Wu, Beijing (CN); Lin Xie, Beijing (CN); Zhoujie Zhang, Beijing (CN)

(73) Assignee: CHINA ELECTRIC POWER RESEARCH INSTITUTE, Beijing (CN)

( * ) Notice: Subject to any disclaimer, the term of this patent is extended or adjusted under 35 U.S.C. 154(b) by 908 days.

(21) Appl. No.: 17/770,332

(22) PCT Filed: Aug. 12, 2021

(86) PCT No.: PCT/CN2021/112325
§ 371 (c)(1),
(2) Date: Apr. 20, 2022

(87) PCT Pub. No.: WO2022/100176
PCT Pub. Date: May 19, 2022

(65) Prior Publication Data
US 2024/0143391 A1   May 2, 2024

(30) Foreign Application Priority Data
Nov. 10, 2020 (CN) .......................... 202011243477.4

(51) Int. Cl.
*G06F 9/48* (2006.01)

(52) U.S. Cl.
CPC .................................. *G06F 9/4881* (2013.01)

(58) Field of Classification Search
None
See application file for complete search history.

(56) References Cited

U.S. PATENT DOCUMENTS

2007/0174839 A1\* 7/2007 Takahashi ............. G06F 9/5083
718/100
2011/0214113 A1\* 9/2011 You ..................... H04L 41/0816
717/168

(Continued)

FOREIGN PATENT DOCUMENTS

| CN | 105894174 A | 8/2016 |
| CN | 107733986 A | 2/2018 |

(Continued)

*Primary Examiner* — Wynuel S Aquino
*Assistant Examiner* — Jordan Scott Motter
(74) *Attorney, Agent, or Firm* — Cooper Legal Group, LLC

(57) ABSTRACT

The present application discloses a dispatching and control cloud data processing method, device and system. The method includes the following operations: pilot node device acquires a global scheduling task, decomposes the global scheduling task to obtain scheduling tasks, issues the scheduling tasks to collaborative node device, acquires data collection ranges and data processing rules of the collaborative node devices, and delivers them to the collaborative node devices; the collaborative node devices receive and execute the scheduling tasks issued by the pilot node device; receives the data collection ranges and the data processing rules issued by the pilot node device, acquires, based on the scheduling tasks, collected data in the data collection ranges, processes the acquired collected data according to the data processing rules to obtain the processed data, uploads the (Continued)

processed data to the pilot node device; the pilot node device receives the processed data uploaded by the collaborative node devices.

14 Claims, 9 Drawing Sheets

(56) References Cited

U.S. PATENT DOCUMENTS

| | | | | |
|---|---|---|---|---|
| 2013/0191843 A1* | 7/2013 | Sarkar | ............... | G06F 9/5066 |
| | | | | 718/105 |
| 2013/0227585 A1* | 8/2013 | Ichikawa | ............ | G06F 9/505 |
| | | | | 718/104 |
| 2014/0281748 A1* | 9/2014 | Ercegovac | ........ | G06F 11/0727 |
| | | | | 714/49 |
| 2017/0177263 A1* | 6/2017 | Das | ................... | G06F 13/382 |
| 2017/0315796 A1* | 11/2017 | Melnik | ................ | G06F 16/16 |
| 2018/0205770 A1* | 7/2018 | Joo | ..................... | H04L 67/51 |
| 2019/0251072 A1* | 8/2019 | Pyle | ................ | G06F 16/2365 |
| 2020/0314204 A1 | 10/2020 | Gesswein et al. | | |
| 2021/0191783 A1* | 6/2021 | Guan | .................. | G06F 9/485 |

FOREIGN PATENT DOCUMENTS

| | | |
|---|---|---|
| CN | 109379420 A | 2/2019 |
| CN | 110609512 A | 12/2019 |
| CN | 112104751 A | 12/2020 |

\* cited by examiner

DISPATCHING AND CONTROL CLOUD DATA PROCESSING METHOD, APPARATUS AND SYSTEM

CROSS-REFERENCE TO RELATED APPLICATION(S)

The present application claims priority to international patent application PCT/CN2021/112325, filed on Aug. 12, 2021, which further claims priority to Chinese patent application No. 202011243477.4, filed on Nov. 10, 2020. The contents of international patent application PCT/CN2021/112325 and Chinese patent application No. 202011243477.4 are hereby incorporated by reference in their entireties.

TECHNICAL FIELD

The present application belongs to the field of data processing, and relates to a dispatching and control cloud data processing method, apparatus and system.

BACKGROUND

A dispatching and control cloud, which is based on cloud computing technology concepts such as virtualization, distribution and servitization, is a cloud service platform for grid dispatching service and is designed according to a three-tier architecture of pilot node, collaborative node and source data terminal. Its architecture design reflects the characteristics of hardware resource virtualization, data standardization and application servitization, and is an important part of the "Three Clouds" built by State Grid Corporation of China. It is an innovative application of information and communication technologies such as "Cloud Computing, Big Data, Internet of Things, Mobile Internet, Artificial Intelligence, Blockchains" in the field of dispatching and control, and important technical means for supporting the operation, and dispatching and control management of power grid, which implements the idea of opening up various disciplines horizontally and multi-level services vertically, and realize the unified collection and management of models and data. As the State Grid Corporation of China pushes forward construction of the dispatching and control cloud, data collected by the dispatching and control cloud grows explosively, the diversification of data types has increased, and requirements for the timeliness of data processing have increased.

In the related art, the implementation of data processing and data quality optimization generally collect data to a dispatching and control master station or a cloud center, and uniformly process the data and perform data evaluation and validation in the cloud center; when a problem occurs during data verification, a source system will process the data and upload it again.

However, centralized processing puts a lot of pressure on the computing and storage of the cloud center; and there may be repeated data uploading caused by the re-uploading by the source system after a data error occurs, the pressure on the bandwidth of the wide area data network is increased, leading to that the centralized computing model based on the cloud center can hardly meet the future development needs of the dispatching and control cloud.

SUMMARY

The present application provides a dispatching and control cloud data processing method, apparatus and system.

In a first aspect of the present application, a dispatching and control cloud data processing method is applied to a pilot node device, the data processing method includes the following operations.

A global scheduling task is obtained, the global scheduling task is decomposed to obtain scheduling tasks, and the scheduling tasks are issued to collaborative node devices.

Data collection ranges and data processing rules of the collaborative node devices are obtained and delivered to the collaborative node devices.

Processed data uploaded by the collaborative node devices is received, where the processed data is collected data processed by the collaborative node devices according to the data processing rules.

In some optional embodiments, the method further includes the following operation.

Data quality of the processed data is evaluated to obtain evaluation results of the processed data; and the processed data whose evaluation result is a preset result is stored.

In some optional implementation modes, the method further includes the following operations.

Initial collection ranges and initial data processing rules of the collaborative node devices are preset according to requirements for the dispatching and control cloud data processing, and delivered to the collaborative node devices.

The data collection ranges and the data processing rules of the collaborative node devices are optimized according to the evaluation results of the processed data, and the optimized data collection ranges and the data processing rules of the collaborative node devices are delivered to the collaborative node devices.

In some optional implementation modes, the method further includes the following operations.

Execution statuses of the scheduling tasks uploaded by the collaborative node devices are received.

Resource usage statuses of the collaborative node devices are acquired.

The scheduling tasks issued to the collaborative node devices are adjusted according to the execution statuses of the scheduling tasks, the resource usage statuses, and the evaluation results of the processed data.

In some optional implementation modes, the method further includes the following operations.

Rule execution statuses uploaded by the collaborative node devices are received. The rule execution status includes normal execution and abnormal execution. When the rule execution status uploaded by a collaborative node device is abnormal execution, a prompt message of abnormal execution of a rule is generated, and data uploaded by the collaborative node device is marked as abnormal data.

In some optional implementation modes, the global scheduling task is a power data processing task, and the power data processing task can be decomposed into a collection task, a cleaning task, a conversion task, and a storage task. The scheduling task includes at least one of the collection task, the cleaning task, the conversion task, or the storage task.

The data collection range includes a device range and a power data category range. The device range is all power devices under the jurisdiction of the collaborative node devices or power devices with a preset voltage level under the jurisdiction of the collaborative node devices. The power data category range is all categories of power data or several preset categories of power data, and the power data category includes grid model data, grid operation data, grid management data and external data received by power grid.

The data processing rule includes at least one of complementing a missing point, smoothing an abrupt changing point, or processing an invalid value.

In a second aspect of the present application, a dispatching and control cloud data processing method is applied to a collaborative node device, the data processing method includes the following operations.

A scheduling task issued by a pilot node device is received and executed.

A data collection range and a data processing rule issued by the pilot node device are received.

Collected data within the data collection range is acquired based on the scheduling task, and the acquired collected data is processed according to the data processing rule to obtain processed data, and the processed data is uploaded to the pilot node device.

In some optional implementation modes, the method further includes the following operations.

An execution status of the scheduling task is monitored, and the execution status of the scheduling task is uploaded to the pilot node device.

A resource usage status is monitored, and the resource usage status is uploaded to the pilot node device.

A rule execution status is monitored, and the rule execution status is uploaded to the pilot node device.

In some optional implementation modes, when the acquired collected data is processed according to the data processing rule to obtain the processed data, a stream processing mode is employed for real-time data, and a batch processing mode is employed for historical data.

In some optional implementation modes, the operation of uploading the processed data to the pilot node device includes the following operations.

The processed data is converted into a preset data format.

The processed data in the preset data format is uploaded to the pilot node device.

In a third aspect of the present application, a dispatching and control cloud data processing method includes the following operations.

A pilot node device acquires a global scheduling task, decomposes the global scheduling task to obtain scheduling tasks, and issues the scheduling tasks to collaborative node devices.

The pilot node device acquires data collection ranges and data processing rules of the collaborative node devices, and delivers the data collection ranges and the data processing rules to the collaborative node devices.

The collaborative node devices receive and execute the scheduling tasks issued by the pilot node device.

The collaborative node devices receive the data collection ranges and the data processing rules issued by the pilot node device.

The collaborative node devices acquire, based on the scheduling tasks, collected data within the data collection ranges, process the acquired collected data according to the data processing rules to obtain the processed data, and upload the processed data to the pilot node device.

The pilot node device receives the processed data uploaded by the collaborative node devices.

In some optional implementation modes, the method further includes the following operations.

The pilot node device presets initial collection ranges and initial data processing rules of the collaborative node devices according to requirements for the dispatching and control cloud data processing, and delivers the initial collection ranges and the initial data processing rules to the collaborative node devices.

The pilot node device evaluates data quality of the processed data to obtain evaluation results of the processed data; and stores the processed data whose evaluation result is a preset result.

The pilot node device optimizes the data collection ranges and data processing rules of the various collaborative node devices according to the evaluation results of the processed data, and delivers the optimized data collection range and data processing rules of the collaborative node devices to the collaborative node devices.

In some optional implementation modes, the method further includes the following operations.

The collaborative node devices monitor execution statuses of the scheduling tasks, and upload the execution statuses of the scheduling task to the pilot node device; monitor resource usage statuses, and upload the resource usage statuses to the pilot node device; monitor rule execution statuses, and upload the rule execution statuses to the pilot node device.

The pilot node device receives the execution statuses of the scheduling tasks uploaded by the collaborative node devices; acquires the resource usage statuses of the collaborative node devices; and adjusts the scheduling tasks issued to the collaborative node devices according to the execution statuses of the scheduling tasks, the resource usage statuses, and the evaluation results of the processed data; receives the rule execution statuses uploaded by the collaborative node devices.

In a fourth aspect of the present application, a dispatching and control cloud data processing apparatus is applied to a pilot node device, the data processing apparatus includes a task decomposition and issue module, a data reception module, and a rule issue module.

The task decomposition and issue module is configured to acquire a global scheduling task, decompose the global scheduling task to obtain scheduling tasks, and distribute the scheduling tasks to collaborative node devices.

The data reception module is configured to receive processed data uploaded by the collaborative node devices, where the processed data is collected data processed by the collaborative node devices according to data processing rules.

The rule issue module is configured to acquire data collection ranges and the data processing rules of the collaborative node devices, and deliver the data collection ranges and the data processing rules to the collaborative node devices.

In some optional implementation modes, the apparatus further includes a data analysis unit.

The data analysis unit is configured to evaluate data quality of the processed data to obtain evaluation results of the processed data; and store the processed data whose evaluation result is a preset result.

In some optional implementation modes, the apparatus further includes a rule presetting module, and a rule optimization module.

The rule presetting module is configured to preset, according to requirements for the dispatching and control cloud data processing, initial collection ranges and initial data processing rules of the collaborative node devices.

The rule optimization module is configured to optimize, according to the evaluation results of the processed data, the data collection ranges and the data processing rules of the collaborative node devices.

The rule issue module is further configured to deliver the optimized data collection ranges and data processing rules of the collaborative node devices to the collaborative node devices.

In some optional implementation modes, the apparatus further includes a rule monitoring module.

The rule monitoring module is configured to receive rule execution statuses of the scheduling tasks uploaded by the collaborative node devices.

In some optional implementation modes, the apparatus further includes a task monitoring module.

The task monitoring module is configured to receive execution statuses of the scheduling tasks uploaded by the collaborative node devices; acquire the resource usage statuses of the collaborative node devices; adjust, according to the execution statuses of the scheduling tasks, the resource usage statuses, and the evaluation results of the processed data, the scheduling tasks issued to the collaborative node devices.

In a fifth aspect of the present application, a dispatching and control cloud data processing apparatus is applied to a collaborative node device, the data processing apparatus includes a task reception and execution module, a rule reception module, and a data management module.

The task reception and execution module is configured to receive and execute scheduling tasks issued by the pilot node device.

The rule reception module is configured to receive a data collection range and a data processing rule issued by the pilot node device.

The data management module is configured to acquire, based on the scheduling tasks, collected data within the data collection range, and process, according to the data processing rule, the acquired collected data to obtain processed data, and upload the processed data to the pilot node device.

In some optional implementation modes, the apparatus further includes a task feedback module, a resource feedback module, and a rule feedback module.

The task feedback module is configured to monitor an execution status of the scheduling task, and upload the execution status of the scheduling tasks to the pilot node device.

The resource feedback module is configured to monitor a resource usage status, and upload the resource usage status to the pilot node device.

The rule feedback module is configured to monitor a rule execution status, and upload the rule execution status to the pilot node device.

In some optional implementation modes, the apparatus further includes a data format conversion module.

The data format conversion module is configured to convert the processed data into a preset data format.

The data management module is further configured to upload the processed data in the preset data format to the pilot node device.

In a sixth aspect of the present application, a dispatching and control cloud data processing system includes a pilot node device and several collaborative node devices connected to the pilot node device.

The pilot node device includes the above-mentioned dispatching and control cloud data processing apparatus applied to the pilot node device.

The collaborative node device includes the above-mentioned dispatching and control cloud data processing apparatus applied to the collaborative node devices.

BRIEF DESCRIPTION OF THE DRAWINGS

The drawings herein are incorporated into the specification and constitute a part of the specification, show embodiments in accordance with the disclosure, and together with the specification are used to explain the principle of the disclosure.

DETAILED DESCRIPTION

Obviously, the described embodiments are a part of, but not all of the embodiments of the present application. Based on the embodiments in the application, all other embodiments obtained by those of ordinary skill in the art without creative work shall fall within the protection scope of this application.

It is to be noted that the terms "first", "second" and the like in the specification and claims of the present application and in the above drawings are used to distinguish similar targets and unnecessarily to describe a specific sequence or sequential order. It will be appreciated that such data may be interchangeable where appropriate, so that the embodiments of the present application described herein can be implemented in a sequence except for those illustrated or described herein. In addition, the terms "include" and "having", as well as any variations thereof, are intended to cover a non-exclusive inclusion, for example, a process, a method, a system, a product, or an apparatus that includes a series of steps or elements is not necessarily limited to those expressly listed steps or elements, but may include other steps or elements not expressly listed or inherent to such process, method, product, or apparatus.

The present application will be described below in further detail in conjunction with drawings.

Figure 1:
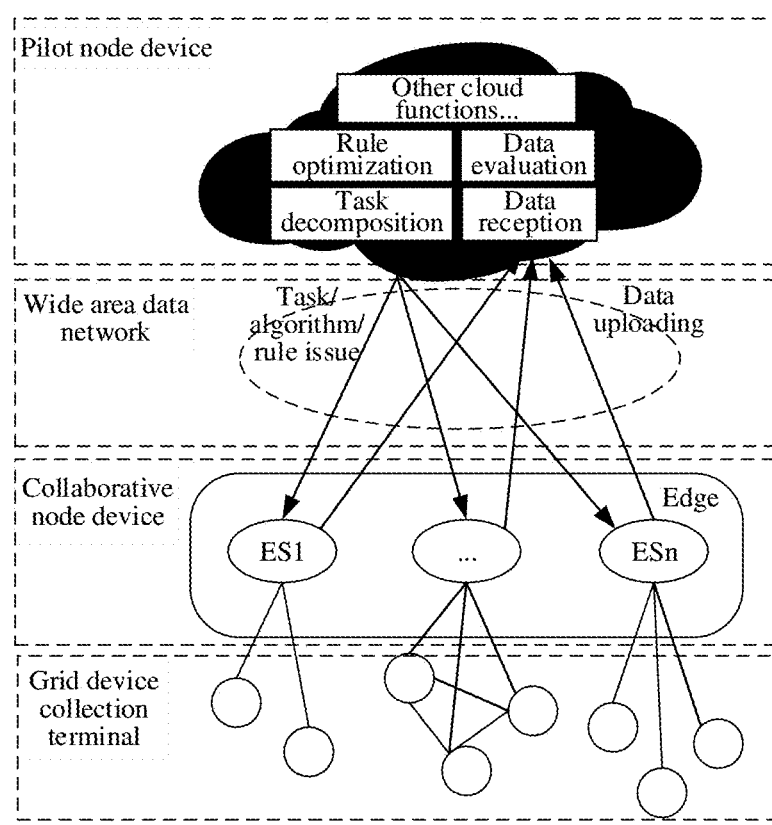
FIG. 1 is a schematic diagram of an overall architecture of a wide-area cloud-edge data collaboration for a dispatching and control cloud architecture of the present application.

Referring to FIG. 1, a dispatching and control cloud platform architecture in an implementation environment involved in various embodiments of the present application is provided. The dispatching and control cloud platform architecture includes a pilot node device, collaborative node devices, and source data devices.

The dispatching and control cloud platform is based on cloud technology concepts of virtualization, distribution and servitization, and is designed according to a three-tier architecture of pilot nodes, collaborative nodes, and source data terminals. Based on the overall architecture of dispatching and control cloud and the concept of edge computing, the overall architecture of the wide-area cloud-edge data collaboration based on the dispatching and control cloud contains three layers, i.e., a dispatching and control cloud pilot node (cloud), collaborative nodes (edge) and source data terminals (terminal). The dispatching and control cloud pilot node (cloud) and the collaborative nodes (edge) are connected through a wide-area data network, and the source data terminals (terminal) and grid collection devices are connected through a Local Area Network (LAN).

The pilot node is responsible for the wide-area cloud-edge collaborative data management, and its bottom layer is supported by and on the basis of hardware, storage, network and other resources provided by the dispatching and control cloud infrastructure platform, as well as bus, authority and other public components. The wide-area interaction of tasks, rules, and data with the collaborative nodes is performed through the wide-area data network further supports service applications on the upper layer of the dispatching and control cloud. The dispatching and control cloud collaborative node is responsible for edge collaborative computing management, its bottom layer is based on the hardware environment provided by the edge infrastructure, collects data collects by all collection devices within its jurisdiction through the local area network, and performs the wide area interaction of tasks, rules and data with the pilot nodes through the wide area data network.

The pilot node device and the collaborative node device may be a server, or may be a server cluster composed of several servers, or a cloud computing service center.

Based on this architecture, the dispatching and control cloud data processing method provided by the embodiments of the present application is applied to the iterative optimization of wide-area data quality, the collected data is cleaned, filtered, and uploaded through computing resources of the collaborative nodes, and the dispatching and control cloud center coordinates computing tasks and data processing rules of all of the collaborative nodes to realize the distribution and feedback of tasks and rules to the collaborative nodes, which can make full use of the computing resources and storage resources of the dispatching and control cloud collaborative nodes (edge), alleviating computing pressure and storage pressure of the dispatching and control cloud center and bandwidth pressure on wide-area data network, and thus realizing wide-area cloud-edge collaborative computing.

Figure 2:
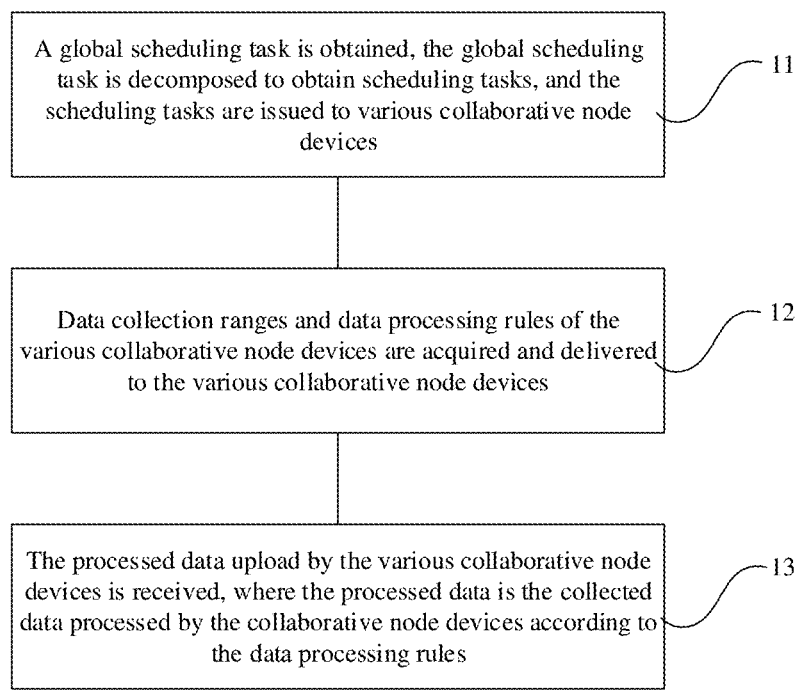
FIG. 2 is a flowchart of a dispatching and control cloud data processing method in an embodiment of the present application.

Referring to FIG. 2, a dispatching and control cloud data processing method provided in an embodiment of the present application is shown. The method is applied to a pilot node device, the embodiment where the dispatching and control cloud data processing method is applied into the implementation environment shown in FIG. 1 is taken as an example, the dispatching and control cloud data processing method includes the following steps.

At S11, a global scheduling task is obtained, the global scheduling task is decomposed to obtain scheduling tasks, and the scheduling tasks are issued to the various collaborative node devices.

The global scheduling task is a power data processing task of the dispatching and control cloud platform generated by the pilot node device based on a final demand for data processing. For specific needs for data collection, cleaning, verification, and the like, the pilot node device decomposes the global scheduling task, and the power data processing task can be decomposed into a collection task, a cleaning task, a conversion task, and a storage task, and tasks that need to be specifically performed by various collaborative nodes are used as scheduling tasks and issued to the corresponding collaborative node devices.

In some optional implementation modes, the pilot node device further receives the execution statuses of the scheduling tasks uploaded by the various collaborative node devices; acquire resource usage statuses of the various collaborative node devices; and adjust the scheduling tasks issued to the various collaborative node devices according to the execution statuses of the various scheduling tasks, the various resource usage statuses, and the evaluation results of the various processed data. As the global collaboration center for the dispatching and control cloud tasks, the pilot node device performs global unified coordination according to the data collection ranges, the resource usage statuses and the task execution statuses of the various collaborative node devices, and makes full use of the computing capabilities of the various collaborative node devices while ensuring data collection quality and efficiency.

For example, when there is a need to perform batch processing or re-transmission of inventory historical data, once a collaborative node device has situations such as insufficient computing resources, overlong data processing time, low data uploading efficiency, the pilot node device will reduce the data processing task of the collaborative node. Correspondingly, the collaborative node device directly uploads part of the data without processing to the pilot node device, the pilot node device allocates corresponding resources for processing. After the work is completed, the pilot node device readjusts the global scheduling task decomposition.

At S12, data collection ranges and data processing rules of the various collaborative node devices are acquired and delivered to the various collaborative node devices.

This step is to ensure the quality of the data uploaded by the various collaborative node devices. The various collaborative node devices are designated to collect data according to the data collection ranges, and to perform data processing according to the data processing rules, which reflects the management function of the pilot node device. In an initial status, according to requirements for the dispatching and control cloud data processing, a system administrator manually configures the data collection ranges of the various collaborative node devices. For example, according to restriction requirements of jurisdiction, voltage level, and data category, the data collection range is divided into a device range and a power data category range, the device range may include all power devices under the jurisdiction of the collaborative node devices or the power devices with a preset voltage level under the jurisdiction of the collaborative node devices, while the power data category range may include all categories of power data or several preset categories of power data, and the power data category includes grid model data, grid operation data, grid management data, and external data received by the power grid. The system administrator configures initial data processing rules of the various collaborative node devices, such as complementing a missing point, smoothing an abrupt changing point, processing one or more invalid values, and distributes the data collection ranges and the data processing rules of the various collaborative node devices to the various collaborative node devices.

In some optional implementation modes, the pilot node device further receives the rule execution statuses uploaded by the various collaborative node devices. The rule execution status includes normal execution and abnormal execution. When the rule execution status uploaded by a collaborative node device is abnormal execution, a prompt message for abnormal execution of a rule is generated, and the data uploaded by the collaborative node device is marked as abnormal data, so that the data, which has not been processed by the rule, that is, the abnormal data, is processed again by the pilot node device to realize monitoring of whether the various collaborative node devices perform normal data processing, and ensuring that the received data uploaded by the various collaborative node devices is processed through the data processing rules so as to ensure data quality.

In some optional implementation modes, after the system runs normally, the data collection ranges and the data processing rules of the various collaborative node devices are optimized according to the various processed data evaluation results of the various collaborative node devices in the pilot node device. For example, for the low data processing speed, the data collection ranges of the collaborative node devices are appropriately reduced or the complexity of the data processing rules are reduced; for the poor quality, more errors or invalid data in the processed data, the data processing rules of the collaborative node devices are properly perfected. Meanwhile, the pilot node device trains and upgrades data processing rules through big data analysis and mining technology, and pushes the upgraded data processing rules to the collaborative node devices to realize iterative update on self-adaptation of the data processing rules of the pilot node device and the various collaborative node devices, and the data quality and the cleaning efficiency is effectively improved based on powerful computing technology of the pilot node device through the data cleaning collaborative interaction technology between the pilot node device and the collaborative node devices. Then, the optimized data collection ranges and data processing rules of the various collaborative node devices are issued to the various collaborative node devices in real time, and the optimization iteration is repeated to improve the data quality of the processed data uploaded by the collaborative node devices.

At S13, the processed data upload by the various collaborative node devices is received, where the processed data is the collected data processed by the collaborative node devices according to the data processing rules.

The various collaborative node devices upload, through the wide area data network, the processed data obtained from the collected data processed according to the data processing rules to the pilot node device, the pilot node device realizes the reception work of the processed data, and after receiving the processed data uploaded by the various collaborative node devices, the pilot node device performs data caching through message conversion and data integration functions. Here, since the processed data is the collected data processed by the collaborative node devices according to the data processing rules, there is no need for the pilot node device to perform processing again, which greatly reduces the computing pressure of the pilot node device. Meanwhile, during the processing of the various collaborative node devices, problematic data will be directly discovered, avoiding repeated data uploading caused by the fact that erroneous data was uploaded, thereby reducing the bandwidth pressure on the wide area data network.

In some optional implementation modes, the data quality of each processed data is evaluated by the pilot node device to obtain an evaluation result of each processed data; and the processed data whose evaluation result is a presetting result is stored. Specifically, multi-source heterogeneous data fusion technology is generally used to aggregate and integrate the various processed data. Multi-source heterogeneous data fusion refers to a technology of using related means to synthesize all the information obtained through collection and analysis, and to perform unified evaluation on the information, and finally obtain the unified information, which is used to synthesize data information from various sources and different structures, absorb the characteristics of different data sources, and then extract unified, better and richer information than single data, and then perform quality evaluation on the various aggregated and integrated processed data through multi-source data quality intelligent comprehensive evaluation. The multi-source data quality intelligent comprehensive evaluation performs, in combination with specific evaluation requirements, multi-source data quality evaluation on-line data parameters, model matching and data intrinsic characteristics.

The data quality uploaded by each of the collaborative node devices is determined, and then the management of the various collaborative node devices can be performed based on the data quality; meanwhile, the high-quality data, that is, the processed data whose evaluation result is high-quality, is stored in a database of the dispatching and control cloud pilot node device, and then data service is provided for the dispatching and control cloud service applications.

In summary, by decomposing the global scheduling task to obtain the scheduling tasks, and issuing them to the various collaborative node devices, it is realized that part of the data processing work is allocated to the collaborative node devices. Since the collaborative node devices perform part of data processing, the data uploaded to the pilot node device is data that has been already processed, so that transmission of junk data is greatly reduced, and the computing and storage resources of the collaborative node device at edge sides are effectively utilized, thereby avoiding large computing and storage pressures on the pilot node device and large bandwidth pressure on the wide are data network for dispatching and control cloud, realizing wide-area cloud edge collaborative computing, and improving the quality of data processing.

In traditional situations, data in the field of dispatching and control is stored in a hierarchically issued way. At the data and service level, there is little real-time interaction and collaborative interaction carried out among all levels, especially after the introduction of cloud computing technology in the dispatching and control field, the idea of opening up various disciplines horizontally and multi-level services vertically is implemented, so the construction of dispatching and control cloud is actually considered to perform unified collection and management on models and data, which in turn leads to great pressure on cloud computing, storage, and networks, and further, tasks, rules and data management aspects between the cloud and the edge are independent from each other and lack collaborative interaction, and single edge computing capability, based on the dynamic demand for data in the dispatching and control field, can no longer meet the dynamic processing needs of the regulatory system for regulatory data. The present application not only utilizes the processing capabilities of the various collaborative node devices to perform preliminary data processing, but also combines the actual needs of the dispatching and control field to strengthen the collaborative interaction between the pilot node device and the various collaborative node devices, and dynamically adjusts the data collection ranges and the data processing rules of the various collaborative node devices and deliver them to the various collaborative node devices to change the processes or results of data processing by the various collaborative node devices, so that the processed data is able to meet the changing dispatching and control needs of the pilot node device, so as to achieve the dynamics of edge data processing functions, fully meet the data requirements of the dispatching and control system, and fully realize the collaborative interaction between the cloud and the edge.

Figure 3:
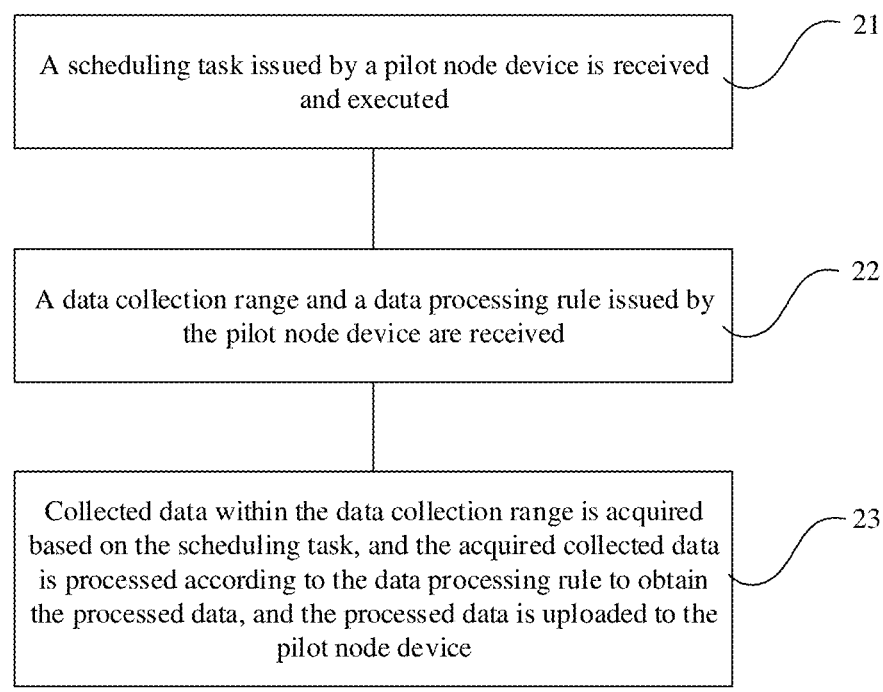
FIG. 3 is a flowchart of a dispatching and control cloud data processing method in another embodiment of the present application.

Referring to FIG. 3, a dispatching and control cloud data processing method provided in another embodiment of the present application is shown. The method is applied to a collaborative node device, the embodiment where the dispatching and control cloud data processing method is applied into the implementation environment shown in FIG. 1 is taken as an example, the dispatching and control cloud data processing method includes the following steps.

At S21, a scheduling task issued by a pilot node device is received and executed.

The various collaborative node devices receive the scheduling tasks issued by the pilot node device through the wide area data network, and perform task analysis, organize various components in the collaborative node devices to work collaboratively, and start to execute the scheduling tasks issued by the pilot node device.

In some optional implementation modes, the collaborative node device will further monitor the execution status of the scheduling task, and upload the execution status of the scheduling task to the pilot node device. In this way, the pilot node device monitors the working statuses of the various collaborative node devices in real time, so as to manage the various collaborative node devices.

In some optional implementation modes, the collaborative node device further monitors the resource usage status and upload the resource usage status to the pilot node device so as to inform the pilot node device of its residual computing capability, and also to provide basic information about task management to the pilot node device.

At S22, a data collection range and a data processing rule issued by the pilot node device are received.

The various collaborative node devices receive the data collection ranges and data processing rules issued by the pilot node device through the wide area data network, and load the data collection ranges and data processing rules into a local memory, to facilitate subsequent data collection through the data collection ranges and processing the collected data according to the data processing rules.

When the data collection ranges and data processing rules have been loaded locally, and the data collection ranges and data processing rules issued by the pilot node device are received again, the general choice is to delete the previous data collection ranges and data processing rules, or directly cover the previous data collection ranges and data processing rules with the new data collection ranges and data processing rules, so as to realize iterative updating of the data collection ranges and the data processing rules.

At S23, collected data within the data collection range is acquired based on the scheduling tasks, and the acquired collected data is processed according to the data processing rule to obtain the processed data, and the processed data is uploaded to the pilot node device.

Based on the scheduling task, that is, in response to the scheduling task, the collaborative node device calls the data collection range information, and performs data collection within the data collection range. The data collection mentioned here may be acquiring data from a collection terminal, or may be directly collecting data, that is, the collaborative node device may have the ability to collect data. Meanwhile, the data processing rules are called to process the collected data, for example, smoothing data at abrupt changing points in the collected data, deleting an invalid value in the collected data, complementing a missing point in the collected data may be complemented through a neighborhood value, or other supplementary rules may be called. This is just an example for illustration and is not limited. After the processing is completed, the processed data is uploaded to the pilot node device, at this point, the collaborative node device completes its own work and makes full use of its computing capability.

To sum up, by receiving and executing the scheduling tasks issued by the pilot node device, receiving the data collection ranges and data processing rules issued by the pilot node device, and based on the scheduling tasks, acquiring the collected data within the data collection ranges, processing the acquired collected data according to data processing rules to obtain the processed data, part of the processing of the data is realized through the collaborative node devices, so that the data uploaded to the pilot node device is data that has been already processed, so that transmission of junk data is greatly reduced, and the computing and storage resources of the collaborative node devices at edge sides are effectively utilized, thereby avoiding large computing pressure and storage pressure on the dispatching and control cloud pilot node device and large bandwidth pressure on the wide area data network, realizing wide-area cloud-edge collaborative computing, and improving the quality of data processing. Meanwhile, on the basis of receiving the data collection ranges and data processing rules issued by the pilot node device, the process or result of data processing is changed to meet the dynamic demand of the dispatching and control system for the dispatching and control data, and the full interaction with the pilot node device is realized.

Figure 4:
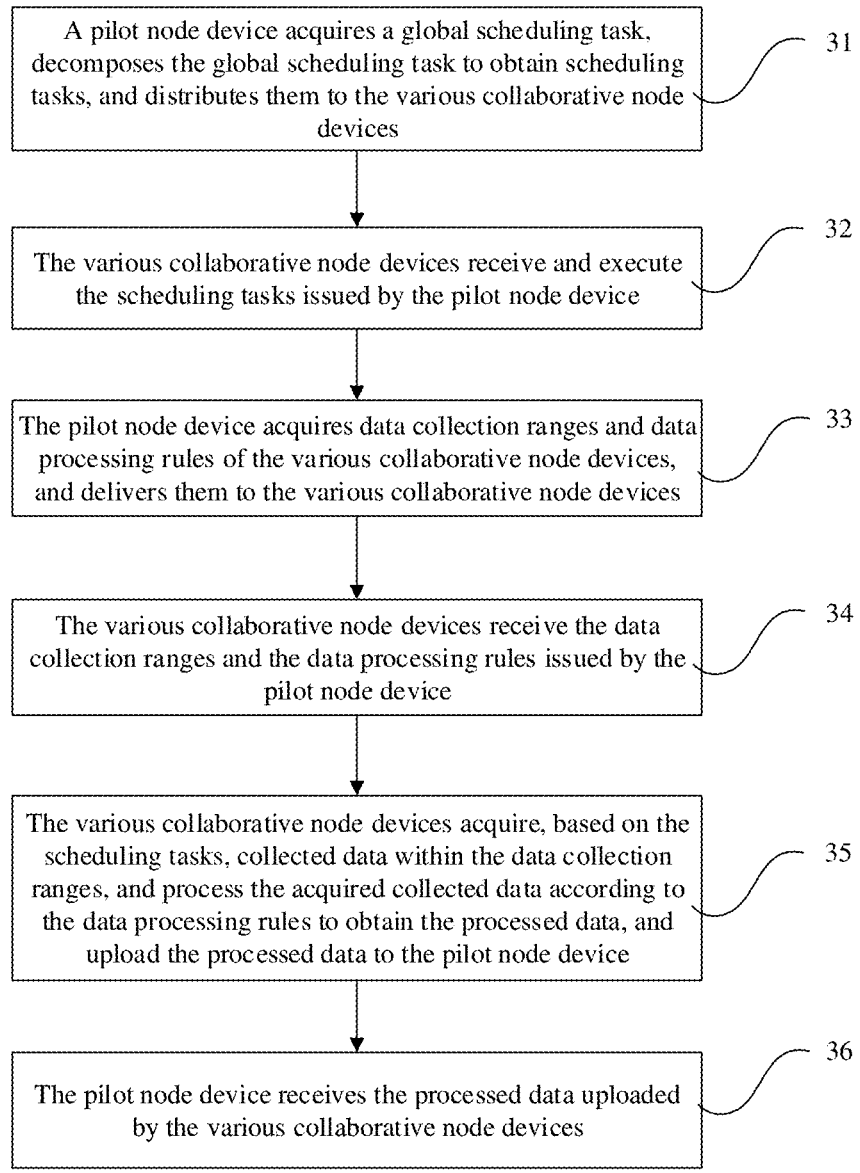
FIG. 4 is a flowchart of a dispatching and control cloud data processing method in still another embodiment of the present application.

Referring to FIG. 4, a dispatching and control cloud data processing method provided in an embodiment of the present application is shown, which includes operation steps of a pilot node device and various collaborative node devices, the embodiment where the dispatching and control cloud data processing method is applied into the implementation environment shown in FIG. 1 to be applied to a power grid dispatching and control system is taken as an example, the dispatching and control cloud data processing method includes the following steps.

At S31, a pilot node device acquires a global scheduling task, decomposes the global scheduling task to obtain scheduling tasks, and distributes them to the various collaborative node devices.

Correspondingly, at S32, the various collaborative node devices receive and execute the scheduling tasks issued by the pilot node device.

Specifically, on the basis of requirements of power grid dispatching and control system for collection, cleaning, conversion and storage of model data, operation data, management data and external data, the pilot node device decomposes the global scheduling task into collection, cleaning, verification and evaluation, and distributes the collection and cleaning tasks to the collaborative node devices to let collaborative node devices complete the tasks. Data cleaning is a process for re-examining and verifying data, and aims to delete repeated information, corrects existing errors, and provides data consistency.

Correspondingly, the various collaborative node devices receive the collection and cleaning tasks issued by the pilot node device and parses task to manage the collaborative node devices to execute the collection and cleaning according to parsed content.

At S33, the pilot node device acquires data collection ranges and data processing rules of the various collaborative node devices, and delivers them to the various collaborative node devices.

Correspondingly, at S34, the various collaborative node devices receive the data collection ranges and the data processing rules issued by the pilot node device.

Specifically, in the initial status, the pilot node device presets, according to collection and cleaning requirements, an initial collection range and a cleaning rule of the various collaborative node devices and distributes them to the various collaborative node devices, and the various collaborative node devices load the received initial collection range and the cleaning rule locally.

At S35: the various collaborative node devices acquire, based on the scheduling tasks, collected data within the data collection ranges, process the acquired collected data according to the data processing rules to obtain the processed data, and upload the processed data to the pilot node device.

Correspondingly, at S36, the pilot node device receives the processed data uploaded by the various collaborative node devices.

Specifically, based on the collection task, the various collaborative node devices start to acquire grid data collected by various grid terminal collection devices within the data collection range. Here, the collaborative node devices collect the data collected by all grid collection devices within its jurisdiction through the local area network, and its jurisdiction changes dynamically, that is, corresponds to the data collection range, cleans the collected grid data, deletes the repeated information in the acquired grid data, and complements missing values, obtains the processed data and converts it into data messages, uploads them to the pilot node device through the wide area data network with a bus and a protocol (according to requirements of dispatching and control cloud pilot node device), the pilot node device receives, through the wide area data network, the processed data uploaded by the various collaborative node devices for subsequent processing.

In some optional implementation modes, after receiving the processed data, the pilot node device further evaluates the data quality of the various processed data to obtain evaluation results of the various processed data; and stores the processed data whose evaluation result is a preset result; then the pilot node device optimizes, according to the evaluation results of the various processed data, the data collection ranges and data processing rules of the various collaborative node devices, and delivers the optimized data collection ranges and data processing rules of the various collaborative node devices to the various collaborative node devices, the various collaborative node devices perform collection and cleaning according to new data collection ranges and cleaning rules. This process is the core of iterative optimization of data quality. Through successive iterative process, it is ensured that the processed data uploaded by the various collaborative node devices meets quality requirements.

In some optional implementation modes, in order to effectively manage the various collaborative node devices, it is necessary to acquire feedback information of the various collaborative node devices, and perform feedback adjustment based on the feedback information. Specifically, the various collaborative node devices monitor the execution statuses of the scheduling tasks, and upload the execution statuses of the scheduling tasks to the pilot node device; monitor the resource usage statuses, and upload the resource usage statuses to the pilot node devices; monitor the rule execution statuses and upload the rule execution statuses to the pilot node device; the pilot node device receives the execution statuses of the scheduling tasks uploaded by the various collaborative node devices; acquire the resource usage statuses of the various collaborative node devices; and adjust the scheduling tasks issued to the various collaborative node devices according to the execution statuses of the various scheduling tasks, the various resource usage statuses, and the evaluation results of the various processed data; for example, if some collaborative node devices cannot complete the cleaning rule processing, the collaborative node devices are no longer needed for the cleaning task, and the collected grid data is directly uploaded.

To sum up, the pilot node device acquires the global scheduling task, decomposes the global scheduling task to obtain scheduling tasks, issues the scheduling tasks to the various collaborative node devices, acquires the data collection ranges and the data processing rules of the various collaborative node devices, and delivers the data collection ranges and the data processing rules to the various collaborative node devices, thereby realizing the allocation of part of the data processing work to the various collaborative node devices. The various collaborative node devices receive and execute the scheduling tasks issued by the pilot node device, receive the data collection ranges and data processing rules issued by the pilot node device, and acquire, based on the scheduling tasks, the collected data within the data collection ranges, process the acquired collected data to obtain the processed data according to the data processing rules, and upload the processed data to the pilot node device, thereby completing part of the data processing work in the various collaborative node devices, so that the data uploaded to the pilot node device is already processed data, which greatly reduces transmission of junk data, and effectively utilizes the computing and storage resources of the various collaborative node devices at edge sides, thereby avoiding large computing pressure and storage pressure on the dispatching and control cloud pilot node device and large bandwidth pressure on the wide are data network, realizing wide-area cloud edge collaborative computing, and improving the quality of data processing.

Figure 5:
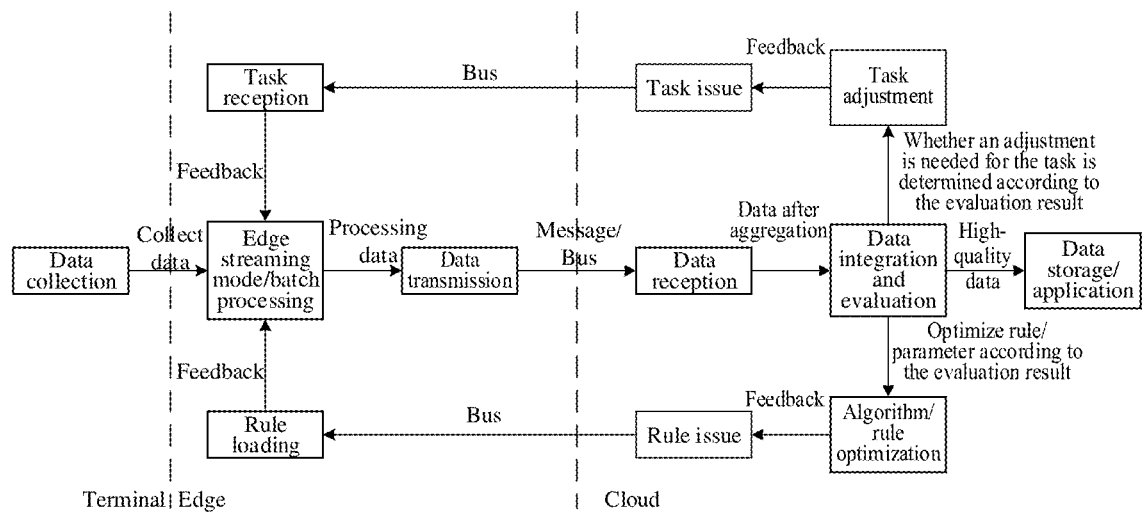
FIG. 5 is a data flow diagram of a data processing method in an embodiment of the present application.

Referring to FIG. 5, a data flow diagram of a data processing method shown in FIG. 4 of the present application is shown. The data flow contains two parts: data from the collaborative node devices to the pilot node device, that is, the service data flow; tasks, rules, and other data for interaction between the pilot node device and the collaborative node devices, that is, management data flow.

Grid data is taken as an example. (1) Service data flow. The grid data involved in the service data flow comes from the grid collection devices, and the original data is uploaded to the collaborative node devices through the local area network. Stream processing and batch processing functions are deployed in the collaborative node devices. According to the data collection ranges and the data processing rules issued by the pilot node device, processes such as cleaning, verifying or the like are performed for real-time data (streaming processing) and historical data (batch processing). The high-quality data processed by the collaborative node devices is converted into a data message, and is sent to the pilot node device through the bus or the protocol (according to requirements of the dispatching and control cloud pilot node).

After receiving the power grid data sent by the various collaborative node devices, the pilot node device performs data caching through message conversion and data integration functions. The integrated data is subjected to a multi-source data quality intelligent comprehensive evaluation function to perform the data quality analysis evaluation, so as to determine the data quality uploaded by the collaborative node devices. The high-quality data is stored in a database of the pilot node devices to provide data service for the dispatching and control cloud service applications.

(2) Management data flow. The management data stream relates to task and rule interactions between the pilot node device and the collaborative node devices. In the above-mentioned service data flow, the pilot node device acquires data quality verification, evaluation results, to determine whether the data processing rules and the scheduling tasks need to be adjusted. If adjustment is needed, the adjusted data processing rule and the scheduling task are fed back to the corresponding collaborative node device through the bus, the collaborative node device receives the data processing rule and the scheduling task, and performs data processing rule application and scheduling task execution on the collaborative node device. The simultaneously relates to rule feedback, task feedback of the collaborative node device and rule monitoring and task monitoring of the dispatching and control cloud center, the process is an iterative process of continuous optimization, which relieves the computing pressure of the dispatching and control cloud pilot node device and the bandwidth pressure of the wide area data network, improving the quality of the grid data.

The following is a device embodiment of the present application, which may be used to execute the method embodiment of the present application. For details undisclosed in the device embodiment, the method embodiment of the present application is referred.

Figure 6:
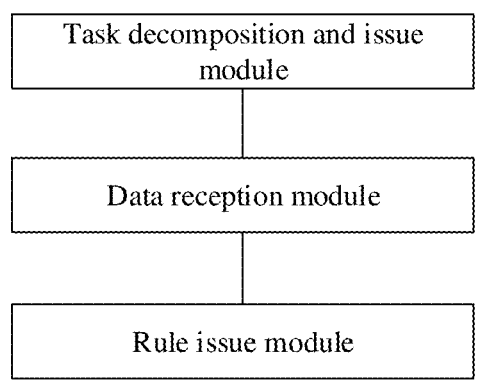
FIG. 6 is a structural block diagram of a dispatching and control cloud data processing apparatus in an embodiment of the present application.

Referring to FIG. 6, a structural block diagram of a dispatching and control cloud data processing apparatus provided by another embodiment of the present application is shown. The dispatching and control cloud data processing apparatus may be implemented as part or all of the pilot node device through software, hardware, or a combination of both. The dispatching and control cloud data processing apparatus includes: a task decomposition and issue module, a data reception module, and a rule issue module.

The task decomposition and issue module is configured to acquire the global scheduling task, decomposes the global scheduling task into the scheduling tasks, and issue them to the various collaborative node devices; the data reception module is configured to receive the processed data uploaded by the various collaborative node devices, where the processed data is collected data processed by the collaborative node devices according to the data processing rules; the rule issue module is used to acquire the data collection ranges and the data processing rules of the various collaborative node devices, and send them to the various collaborative node devices.

In some optional implementation modes, the dispatching and control cloud data processing apparatus further includes a data analysis unit, which is configured to evaluate the data qualities of the various processed data to obtain evaluation results of the various processed data; and store the processed data whose evaluation result is a preset result. Specifically, the data analysis unit includes a data integration module and a data evaluation module; the data integration module is configured to summarize and integrate various processed data through multi-source heterogeneous data fusion technology; the data evaluation module is configured to perform quality evaluation on the aggregated integrated processed data through multi-source data quality intelligent comprehensive evaluation to obtain the evaluation results of the various processed data; and the processed data whose evaluation result is a preset result is stored.

In some optional implementation modes, the dispatching and control cloud data processing apparatus further includes: a rule presetting module, a rule optimization module, a rule monitoring module and a task monitoring module.

The rule presetting module is configured to preset, according to requirements for the dispatching and control cloud data processing, initial collection ranges and initial data processing rules of the various collaborative node devices. The rule optimization module is configured to optimize, according to the evaluation results of the various processed data, the data collection ranges and the data processing rules of the various collaborative node devices. The rule issue module is further configured to distribute the optimized data collection ranges and data processing rules of the various collaborative node devices to the various collaborative node devices. The rule monitoring module is configured to receive the rule execution statuses uploaded by the various collaborative node devices. The task monitoring module is configured to receive the execution statuses of the scheduling tasks uploaded by the various collaborative node devices; acquire the resource usage statuses of the various node devices; adjust the scheduling tasks issued to the various collaborative node devices according to the execution statuses of the various scheduling tasks, the various resource usage statuses and evaluation results of the various processed data.

Figure 7:
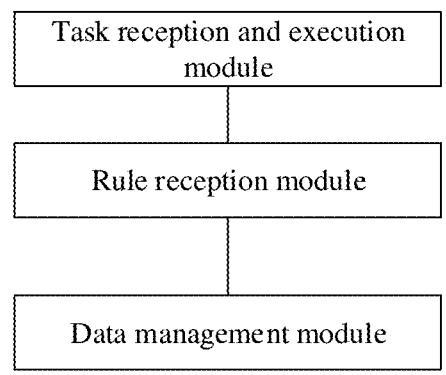
FIG. 7 is a structural block diagram of a dispatching and control cloud data processing apparatus in another embodiment of the present application.

Referring to FIG. 7, a structural block diagram of a dispatching and control cloud data processing apparatus provided by another embodiment of the present application is shown. The dispatching and control cloud data processing apparatus may be implemented as part or all of the collaborative node devices through software, hardware, or a combination of both. The dispatching and control cloud data processing apparatus includes: a task reception and execution module, a rule reception module, and a data management module.

The task reception and execution module is configured to receive and executes the scheduling tasks issued by the pilot node device; the rule reception module is configured to receive a data collection range and a data processing rule issued by the pilot node device; the data management module is configured to acquire, based on the scheduling task, the collected data within the data collection range, and process, according to the data processing rule, the acquired collected data to obtain the processed data, and upload the processed data to the pilot node device.

In some optional implementation modes, the dispatching and control cloud data processing apparatus further includes: a task feedback module, a resource feedback module, a rule feedback module, and a data format conversion module.

The task feedback module is configured to monitor the execution status of the scheduling task and upload the execution status of the scheduling task to the pilot node device. The resource feedback module is configured to monitor the resource usage statuses, and upload the resource usage status to the pilot node device. The rule feedback module is configured to monitor the rule execution status and upload the rule execution status to the pilot node device. The data format conversion module is configured to convert the processed data into a preset data format. The data management module is further configured to upload the processed data in the preset data format to the pilot node device.

Figure 8:
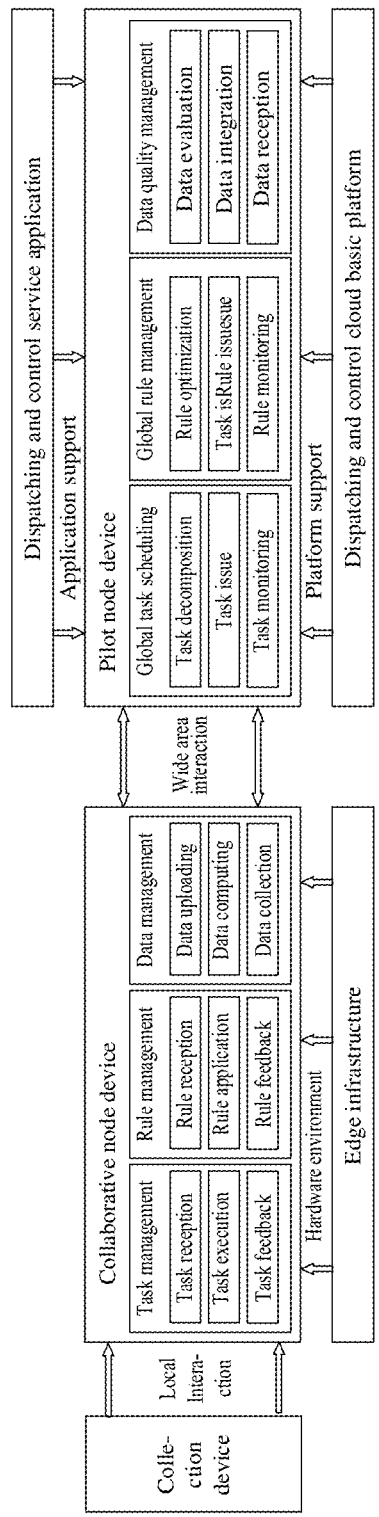
FIG. 8 is a structural block diagram of a dispatching and control cloud data processing apparatus in still another embodiment of the present application.

Referring to FIG. 8, a structural block diagram of a dispatching and control cloud data processing system provided by another embodiment of the present application is shown. The dispatching and control cloud data processing system includes: a pilot node device and several collaborative node devices connected to the pilot node device, the several collaborative node devices are connected with the pilot node device through a wide area data network.

The pilot node device includes the dispatching and control cloud data processing apparatus provided in the embodiment shown in FIG. 6; the collaborative node device includes the dispatching and control cloud data processing apparatus provided in the embodiment shown in FIG. 7.

Figure 9:
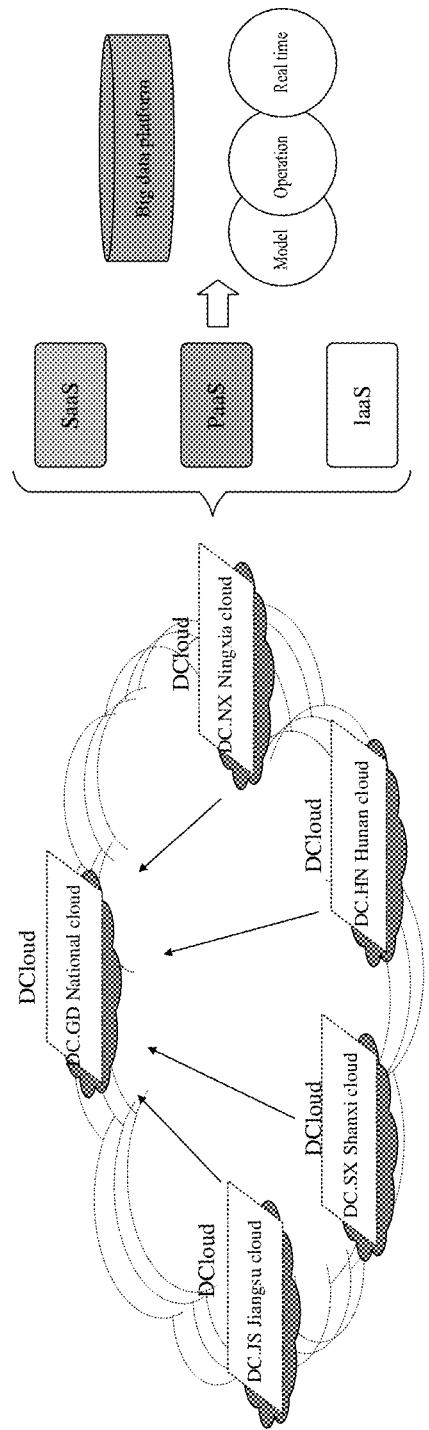
FIG. 9 is a schematic diagram of a dispatching and control cloud architecture constructed by taking a power grid as an example according to the present application.

The dispatching and control cloud data processing method of the present application can be better applied in the field of power automation technology, and realize the application of computer algorithms in the field of electrical automation. Specifically, referring to FIG. 9, the dispatching and control cloud constructed with power grid as an example is based on cloud computing technology concepts such as virtualization, distribution, and servitization, and is a cloud service platform for grid dispatching service, its architecture design reflects the characteristics of hardware resource virtualization, data standardization, and application servitization, and is an important part of the "Three Clouds" built by State Grid Corporation of China. It is an innovative application of information and communication technologies such as "Cloud Computing, Big Data, Internet of Things, Mobile Internet, Artificial Intelligence, Blockchains" in the field of dispatching and control, and an important technical means for supporting the operation and dispatching of power grids. Combining the dispatching and control service production organization model, the dispatching and control cloud follows a hierarchical deployment model that is compatible with the principle of "unified scheduling and hierarchical management", and builds a cross-dispatching agency "1 national (sub) pilot node+N provinces (regions) collaborative nodes", which is a two-level deployment dispatching and control cloud system.

The national cloud, serving as the pilot node device, is composed of part or all of the dispatching and control cloud data processing apparatus shown in FIG. 6, and is responsible for managing and controlling the operation of the various collaborative nodes, and achieving interconnection with the various collaborative nodes and information exchange, integrating full models of the whole network above 35 kV, which gathers operating data and real-time data above 220 kV, for dispatching major network service from the state to the province, and deploys related application functions; the provincial local cloud, as a collaborative node device, includes the dispatching and control cloud data processing apparatus shown in FIG. 7, cooperates with the pilot node to process data collection and aggregation, integrates provincial network models above 10 kV, collects operating data and real-time data above 10 kV, for dispatching regional power grid services from the province to the county, and deploys related application functions. Based on a unified architecture, the national cloud and the provincial cloud can operate independently to form an organic collaborative entirety to realize source-end maintenance, automatic integration, unified service, and global sharing of various information resources.

In yet another embodiment, the present application further provides a storage medium, in particular a computer-readable storage medium (Memory), which is a memory device in a terminal device for storing programs and data. It may be understood that the computer-readable storage medium herein may include a built-in storage medium in the terminal device, and of course, may also include an extended storage medium supported by the terminal device. The computer-readable storage medium provides storage space, and the storage space stores the operating system of the terminal. In addition, one or more instructions suitable for being loaded and executed by the processor are stored in the storage space, and these instructions may be one or more computer programs (including program codes). It is to be noted that the computer-readable storage medium herein may be a high-speed Random Access Memory (RAM) memory, or a non-volatile memory (non-volatile memory), such as at least one disk memory. One or more instructions stored in the computer-readable storage medium may be loaded and executed by the processor to implement the corresponding steps in the above-mentioned embodiment related to the dispatching and control cloud data processing method.

Those skilled in the art should understand that the embodiments of the present application may be provided as methods, systems, or computer program products. Therefore, this application may adopt the form of a complete hardware embodiment, a complete software embodiment, or an embodiment combining software and hardware. Moreover, this present application may adopt the form of a computer program product implemented on one or more computer-usable storage media (including but not limited to disk storage, Compact Disc Read-Only Memory (CD-ROM), optical storage, etc.) containing computer-usable program codes.

The present application is described with reference to flowcharts and/or block diagrams of methods, devices (systems), and computer program products according to embodiments of this application. It should be understood that each process and/or block in the flowchart and/or block diagram, and the combination of processes and/or blocks in the flowchart and/or block diagram can be realized by computer program instructions. These computer program instructions can be provided to the processor of a general-purpose computer, a special-purpose computer, an embedded processor, or other programmable data processing equipment to generate a machine, so that the instructions executed by the processor of the computer or other programmable data processing equipment are generated for use It is a device that realizes the functions specified in one process or multiple processes in the flowchart and/or one block or multiple blocks in the block diagram.

These computer program instructions can also be stored in a computer-readable memory that can guide a computer or other programmable data processing equipment to work in a specific manner, so that the instructions stored in the computer-readable memory produce an article of manufacture including the instruction device. The device implements the functions specified in one process or multiple processes in the flowchart and/or one block or multiple blocks in the block diagram.

These computer program instructions can also be loaded on a computer or other programmable data processing equipment, so that a series of operation steps are executed on the computer or other programmable equipment to produce computer-implemented processing, so as to execute on the computer or other programmable equipment. Instructions provide steps for implementing functions specified in a flow or multiple flows in the flowchart and/or a block or multiple blocks in the block diagram.

Finally, it is to be noted that the above embodiments are only illustrative and not to limit the present disclosure. Although the present application has been described in detail with reference to the above embodiments, those of ordinary skill in the art should understand that: modifications or equivalent replacements are made to the specific embodiments of, and any modifications or equivalent replacements that do not depart from the spirit and scope of the present application shall be covered by the protection scope of the claims of the present application.

What is claimed is:

1. A dispatching and control cloud data processing method, performed by a pilot node device, comprising:
    acquiring a global scheduling task, decomposing the global scheduling task to obtain scheduling tasks, and issuing the scheduling tasks to collaborative node devices;
    acquiring data collection ranges and data processing rules of the collaborative node devices, and delivering the data collection ranges and the data processing rules to the collaborative node devices;
    receiving processed data uploaded by the collaborative node devices, wherein the processed data is collected data processed by the collaborative node devices according to the data processing rules;
    evaluating data quality of the processed data to obtain evaluation results of the processed data;
    storing the processed data whose evaluation result is a preset result;
    receiving execution statuses of the scheduling tasks uploaded by the collaborative node devices;
    acquiring resource usage statuses of the collaborative node devices; and
    adjusting, according to the execution statuses of the scheduling tasks, the resource usage statuses, and the evaluation results of the processed data, the scheduling tasks issued to the collaborative node devices,
    wherein the global scheduling task is a power data processing task, and the power data processing task is decomposed into a collection task, a cleaning task, a conversion task, and a storage task, and the scheduling task comprises at least one of the collection task, the cleaning task, the conversion task, or the storage task;
    the data collection ranges comprise a device range and a power data category range, wherein the device range is all power devices under a jurisdiction of the collaborative node devices or power devices with a preset voltage level under the jurisdiction of the collaborative node devices, the power data category range is all categories of power data or several preset categories of power data, and the categories of power data comprise power grid model data, power grid operation data, power grid management data and external data received by power grid;
    the data processing rules comprise at least one of complementing a missing point, smoothing an abrupt changing point, or processing an invalid value.

2. The dispatching and control cloud data processing method of claim 1, further comprising:
    presetting, according to requirements for the dispatching and control cloud data processing, initial collection ranges and initial data processing rules of the collaborative node devices, and delivering the initial collection ranges and the initial data processing rules to the collaborative node devices; and
    optimizing, according to the evaluation results of the processed data, the data collection ranges and the data processing rules of the collaborative node devices, and delivering the optimized data collection ranges and data processing rules of the collaborative node devices to the collaborative node devices.

3. The dispatching and control cloud data processing method of claim 1, further comprising:
    receiving rule execution statuses uploaded by the collaborative node devices, wherein the rule execution status comprises normal execution and abnormal execution;
    in a case where rule execution status uploaded by a collaborative node device is abnormal execution, generating a prompt message of abnormal execution of a rule, and marking data uploaded by the collaborative node device as abnormal data.

4. A pilot node device, comprising:
    a processor; and
    a memory, storing instructions executable to the processor;
    wherein the processor is configured to execute the instructions in the memory to implement the dispatching and control cloud data processing method of claim 1.

5. A dispatching and control cloud data processing system, comprising: the pilot node device of claim 4 and several collaborative node devices, wherein the pilot node device is connected to the several collaborative node devices through a wide-area data network,
    wherein each of the several collaborative node devices comprises:
    the processor; and
    the memory, storing the instructions executable to the processor;
    wherein the processor is configured to execute the instructions in the memory to:
    receive and execute a scheduling task issued by the pilot node device;
    receive a data collection range and a data processing rule issued by the pilot node device;
    acquire, based on the scheduling task, the collected data within the data collection range, process, according to the data processing rule, the acquired collected data to obtain the processed data, and upload the processed data to the pilot node device;
    monitor an execution status of the scheduling task, and upload the execution status of the scheduling task to the pilot node device;
    monitor a resource usage status, and upload the resource usage status to the pilot node device; and
    monitor a rule execution status, and upload the rule execution status to the pilot node device,
    wherein the scheduling task comprises at least one of the collection task or the cleaning task,
    the data collection range comprises the device range and the power data category range, wherein the device range is all power devices under the jurisdiction of the several collaborative node devices or power devices with the preset voltage level under the jurisdiction of the several collaborative node devices, the power data category range is all categories of power data or several preset categories of power data, and the categories of power data comprise power grid model data, power grid operation data, power grid management data and external data received by power grid;
    the data processing rule comprises the at least one of complementing the missing point, smoothing the abrupt changing point, or processing the invalid value.

6. A non-volatile computer-readable storage medium, having computer-executable instructions stored thereon, wherein the instructions, when executed by an electronic device, causes a processor in the electronic device to implement the dispatching and control cloud data processing method of claim 1.

7. A dispatching and control cloud data processing method, performed by a collaborative node device, comprising:
  receiving and executing a scheduling task issued by a pilot node device;
  receiving a data collection range and a data processing rule issued by the pilot node device;
  acquiring, based on the scheduling task, collected data within the data collection range, processing, according to the data processing rule, the acquired collected data to obtain processed data, and uploading the processed data to the pilot node device;
  monitoring an execution status of the scheduling task, and uploading the execution status of the scheduling task to the pilot node device;
  monitoring a resource usage status, and uploading the resource usage status to the pilot node device; and
  monitoring a rule execution status, and uploading the rule execution status to the pilot node device,
  wherein the scheduling task comprises at least one of a collection task or a cleaning task,
  the data collection range comprises a device range and a power data category range, wherein the device range is all power devices under a jurisdiction of the collaborative node device or power devices with a preset voltage level under the jurisdiction of the collaborative node device, the power data category range is all categories of power data or several preset categories of power data, and the categories of power data comprise power grid model data, power grid operation data, power grid management data and external data received by power grid;
  the data processing rule comprises at least one of complementing a missing point, smoothing an abrupt changing point, or processing an invalid value.

8. The dispatching and control cloud data processing method of claim 7, wherein when the acquired collected data is processed according to the data processing rule to obtain the processed data, a stream processing mode is employed for real-time data, and a batch processing mode is employed for historical data.

9. The dispatching and control cloud data processing method of claim 7, wherein uploading the processed data to the pilot node device comprises:
  converting the processed data into a preset data format; and
  uploading the processed data in the preset data format to the pilot node device.

10. A collaborative node device, comprising:
  a processor; and
  a memory, storing instructions executable to the processor;
  wherein the processor is configured to execute the instructions in the memory to implement the dispatching and control cloud data processing method of claim 7.

11. A dispatching and control cloud data processing system, comprising: the pilot node device and several collaborative node devices of claim 10, wherein the pilot node device is connected to the several collaborative node devices through a wide-area data network,
  wherein the pilot node device comprises:
  the processor; and
  the memory, storing the instructions executable to the processor;
  wherein the processor is configured to execute the instructions in the memory to:
    acquire a global scheduling task, decompose the global scheduling task to obtain scheduling tasks, and issue the scheduling tasks to the several collaborative node devices;
    acquire data collection ranges and data processing rules of the several collaborative node devices, and deliver the data collection ranges and the data processing rules to the several collaborative node devices;
    receive the processed data uploaded by the several collaborative node devices, wherein the processed data is collected data processed by the several collaborative node devices according to the data processing rules;
    evaluate data quality of the processed data to obtain evaluation results of the processed data; and store the processed data whose evaluation result is a preset result;
    receive execution statuses of the scheduling tasks uploaded by the collaborative node devices;
    acquire resource usage statuses of the collaborative node devices; and
    adjust, according to the execution statuses of the scheduling tasks, the resource usage statuses, and the evaluation results of the processed data, the scheduling tasks issued to the collaborative node devices,
  wherein the global scheduling task is a power data processing task, and the power data processing task is decomposed into the collection task, the cleaning task, the conversion task, and the storage task, and the scheduling task comprises at least one of the collection task, the cleaning task, the conversion task, or the storage task;
  the data collection range comprises the device range and the power data category range, wherein the device range is all power devices under the jurisdiction of the several collaborative node devices or power devices with the preset voltage level under the jurisdiction of the several collaborative node devices, the power data category range is all categories of power data or several preset categories of power data, and the categories of power data comprise the power grid model data, the power grid operation data, the power grid management data and the external data received by power grid;
  the data processing rule comprises the at least one of complementing the missing point, smoothing the abrupt changing point, or processing the invalid value.

12. A non-volatile computer-readable storage medium, having computer-executable instructions stored thereon, wherein the instructions, when executed by an electronic device, causes a processor in the electronic device to implement the dispatching and control cloud data processing method of claim 7.

13. A dispatching and control cloud data processing method, comprising:
  acquiring, by a pilot node device, a global scheduling task, decomposing the global scheduling task to obtain scheduling tasks, and issuing the scheduling tasks to collaborative node devices;
  acquiring, by the pilot node device, data collection ranges and data processing rules of the collaborative node devices, and delivering the data collection ranges and the data processing rules to the collaborative node devices;
  receiving and executing, by the collaborative node devices, the scheduling tasks issued by the pilot node device;

receiving, by the collaborative node devices, the data collection ranges and the data processing rules issued by the pilot node device;

acquiring, by the collaborative node devices, collected data within the data collection ranges based on the scheduling tasks, processing, according to the data processing rules, the acquired collected data to obtain processed data, and uploading the processed data to the pilot node device; and receiving, by the pilot node device, the processed data uploaded by the collaborative node devices;

evaluating, by the pilot node device, data quality of the processed data to obtain evaluation results of the processed data; and storing the processed data whose evaluation result is a preset result;

monitoring, by the collaborative node devices, execution statuses of the scheduling tasks, and uploading the execution statuses of the scheduling tasks to the pilot node device; monitoring resource usage statuses, and uploading the resource usage statuses to the pilot node device; monitoring rule execution statuses, and uploading the rule execution statuses to the pilot node device; and receiving, by the pilot node device, the execution statuses of the scheduling tasks uploaded by the collaborative node devices; acquiring the resource usage statuses of the collaborative node devices; and adjusting, according to the execution statuses of the scheduling tasks, the resource usage statuses, and the evaluation results of the processed data, the scheduling tasks issued to the collaborative node devices; and receiving the rule execution statuses uploaded by the collaborative node devices, wherein the global scheduling task is a power data processing task, and the power data processing task is decomposed into a collection task, a cleaning task, a conversion task, and a storage task, and the scheduling tasks comprise at least one of the collection task, the cleaning task, the conversion task, or the storage task;

the data collection ranges comprise a device range and a power data category range, wherein the device range is all power devices under a jurisdiction of the collaborative node devices or power devices with a preset voltage level under the jurisdiction of the collaborative node devices, the power data category range is all categories of power data or several preset categories of power data, and the categories of power data comprise power grid model data, power grid operation data, power grid management data and external data received by power grid;

the data processing rule comprises at least one of complementing a missing point, smoothing an abrupt changing point, or processing an invalid value.

14. The dispatching and control cloud data processing method of claim 13, further comprising:

presetting, by the pilot node device, initial collection ranges and initial data processing rules of the collaborative node devices according to requirements for dispatching and control cloud data collection, and delivering the initial collection ranges and the initial data processing rules to the collaborative node devices; and optimizing, by the pilot node device, the data collection ranges and the data processing rules of the collaborative node devices according to the evaluation results of the processed data, and delivering the optimized data collection ranges and data processing rules of the collaborative node devices to the collaborative node devices.

* * * * *